March 23, 1943. E. E. HEWITT 2,314,397
LOCOMOTIVE BRAKE EQUIPMENT
Filed Feb. 28, 1941 2 Sheets-Sheet 1

INVENTOR
ELLIS E. HEWITT
BY
ATTORNEY

March 23, 1943. E. E. HEWITT 2,314,397
LOCOMOTIVE BRAKE EQUIPMENT
Filed Feb. 28, 1941 2 Sheets-Sheet 2

RELEASE POSITION.

RUNNING POSITION.

INVENTOR
ELLIS E. HEWITT
BY
ATTORNEY

Patented Mar. 23, 1943

2,314,397

UNITED STATES PATENT OFFICE 2,314,397

LOCOMOTIVE BRAKE EQUIPMENT

Ellis E. Hewitt, Edgewood, Pa., assignor to The Westinghouse Air Brake Company, Wilmerding, Pa., a corporation of Pennsylvania Application February 28, 1941, Serial No. 380,972

31 Claims. (Cl. 303—59)

This invention relates to fluid pressure brake equipment of the automatic type embodying a brake pipe, and more particularly to means for controlling the supply of fluid under pressure to or the charging of said brake pipe.

The usual locomotive brake equipment embodies an engineer's automatic brake valve device and a feed valve device for controlling the supply of fluid under pressure from the main reservoir on the locomotive to the brake pipe on a train. The brake valve device has two brake pipe charging positions known as release position and running position. In charging the brake pipe on a train the brake valve device is generally first moved to the release position for establishing a direct communication between the main reservoir and brake pipe so that fluid at the high pressure in the main reservoir may flow directly to the brake pipe for causing a rapid increase in pressure therein and thereby a quick release of brakes on the train. After a certain length of time in release position the brake valve device is then moved to running position in which the feed valve device is rendered effective to control the further charging of the brake pipe up to the normal pressure desired to be carried and to then maintain the brake pipe pressure at said normal pressure while the train is running with the brakes released. Further, in running position the supply of fluid from the brake valve device to the brake pipe is sufficiently restricted or throttled that a reduction in brake pipe pressure may be effected by operation of the usual conductor's valve back in the train to apply the train brakes, as well as to ensure that an emergency reduction in brake pipe pressure initiated anywhere in the train, due for instance to a burst hose, will travel through the train and cause an emergency application of train brakes.

When the brake valve device is in release position, the brake pipe pressure on a few cars adjacent the locomotive may become increased to substantially that in the main reservoir. Then when the brake valve device is moved to running position the brake pipe pressure at this point will drop, due to flow toward the rear end of the train, to the adjustment of the feed valve device, which will then start functioning to supply fluid to the brake pipe and to maintain the brake pipe pressure at the head end of the train substantially equal to that desired to be carried.

It is well known that the reservoirs of brake equipment on cars of a train are charged at a restricted rate by flow of fluid under pressure from the brake pipe. If the brake valve device is left in release position too long, there is therefore the possibility that the brake equipment on some cars adjacent the locomotive may become somewhat overcharged, i. e., charged with fluid at a pressure higher than supplied by the feed valve device. Then when the brake valve device is moved to running position and the brake pipe pressure adjacent the locomotive reduces to the adjustment of the feed valve device, the overcharged equipments may operate in response to the resulting reduction in brake pipe pressure to apply the brakes on those cars resulting in what is commonly known as stuck brakes. If the brake equipment on the cars is of the present standard AB type, and becomes overcharged, such a reduction in brake pipe pressure might cause the operation of one or another of the equipments adjacent the locomotive to initiate quick service action which would then travel serially through the train and cause a limited application of brakes on all cars of the train. The obtaining of either stuck brakes or of a limited quick service application of train brakes when charging the brake pipe of a train is of course undesirable since both time and fluid under pressure are required to obtain a release thereof to thereby recondition the train for movement.

The undesired operation just set forth may be avoided by not allowing the brake valve device to remain in release position for too long a period of time. Premature movement of the brake valve device from release position will on the other hand sacrifice, to a certain degree, the benefits to be derived from the use of release position. Moreover, the period of time which the brake valve device should be left in release position to obtain the maximum benefit thereof is a variable dependent upon the length of train and the degree of pressure in the brake pipe at the time of movement to the release position. As is well known, it is a case of judgment on the part of the engineer when he should move the brake valve device out of release position to running position.

One object of the invention is the provision of improved means for controlling the charging of the brake pipe on a train which does not require judgment on the part of the engineer, which eliminates the danger of brakes on any part of the train becoming undesirably applied, and which is adapted to provide substantially the same desirable results obtainable by the equipment above described when most efficiently operated.

Another object of the invention is the provision of improved brake pipe charging means comprising a brake valve device having a release position and a running position, and a feed valve device, both of which devices are so designed and arranged as to cooperate in said release position to provide substantially as rapid charging of the brake pipe as heretofore obtained, without, however, the danger of obtaining an overcharged brake pipe or the possibility of an undesired application of train brakes as above described, and which in running position provides for the brakes on the train being applied by operation of a conductor's valve, a burst hose, etc.

In brake equipments of the type above described, when the brake valve device is moved from the release position to running position, the brake pipe is first disconnected from the main reservoir and then after a certain further movement is connected to the feed valve device which at this instant will be in closed position. When the brake pipe is thus disconnected from the main reservoir, the brake pipe pressure adjacent the locomotive will suddenly drop as before mentioned and is liable to drop slightly below the adjustment of the feed valve device or to a degree below normal before the feed valve device will respond to supply fluid under pressure to the brake pipe. Thus, even though the release position of the brake valve device is not used for a sufficient period of time to result in an actual overcharge of car brake equipments adjacent the locomotive the degree of charge may be such as to result in operation of one or another of said equipments to initiate a quick service reduction in brake pipe pressure before the feed valve device responds to bring the brake pipe pressure back to normal. This of course is undesirable.

Another object of the invention is therefore the provision of improved brake pipe charging means in which no undesirable drop in brake pipe pressure will occur upon moving the brake valve device from release position to running position, so as to thereby avoid the possibility of a brake application occurring as just set forth.

The above objects are obtained by the use of a feed valve device having greater flow capacity than heretofore employed and by the provision of a brake valve device having an improved brake pipe charging communication including large flow capacity ports, cavities, etc., for connecting the feed valve device to the brake pipe in the release position. Novel control arrangements for the feed valve device are also provided which in the release position of the brake valve device act to cause the feed valve device to operate at maximum capacity during the major portion of the brake pipe charging period and during the remainder of the charging period at a relatively greater capacity with respect to the existing brake pipe pressure than obtainable with brake pipe charging arrangements heretofore employed. A restriction is provided in the brake valve device which becomes effective in the running position to throttle the flow of fluid under pressure from the feed valve device to the brake pipe to the usual degree commonly employed, so as to thereby insure that an application of train brakes may be effected by operation of a conductor's valve or in case of a burst hose etc. Moreover, the brake valve device is so designed that there is no closing off of the supply of fluid under pressure from the feed valve device to the brake pipe in moving from release to running position. Such movement merely gradually effects a reduction in the flow capacity of the charging communication through the brake valve device, so that no temporary reduction in brake pipe pressure to a degree below normal can occur during such movement, thus obviating the possibility of obtaining an undesired application of train brakes from such a cause.

It has been found that this improved arrangement will charge a brake pipe in substantially the same length of time as heretofore obtained by connecting the brake pipe directly to the main reservoir in release position of the brake valve device. This arrangement also avoids undesired overcharging of the brake pipe with the possibility of obtaining an undesired application of the brakes as hereinbefore described, thus avoiding unnecessary loss of fluid under pressure and of time in preparing a train for movement. Further, no judgment on the part of the engineer is required as to how long the brake valve device is left in release position since the brake pipe cannot overcharge. It is however desirable that when a train is running the brake valve device be in running position to insure that an application of train brakes may be effected by operation of a conductor's valve etc. To insure this, the brake valve device is provided with the usual warning port which operates continually in release position as a signal to the engineer of said position so that the engineer will move the brake valve device to and carry same in running position after the train is charged and while moving same. In running position the warning port of course is cut out, as is usual practice.

Other objects and advantages will be apparent from the following more detailed description of the invention.

In the accompanying drawings.

*Description*

Figures 1, 2:
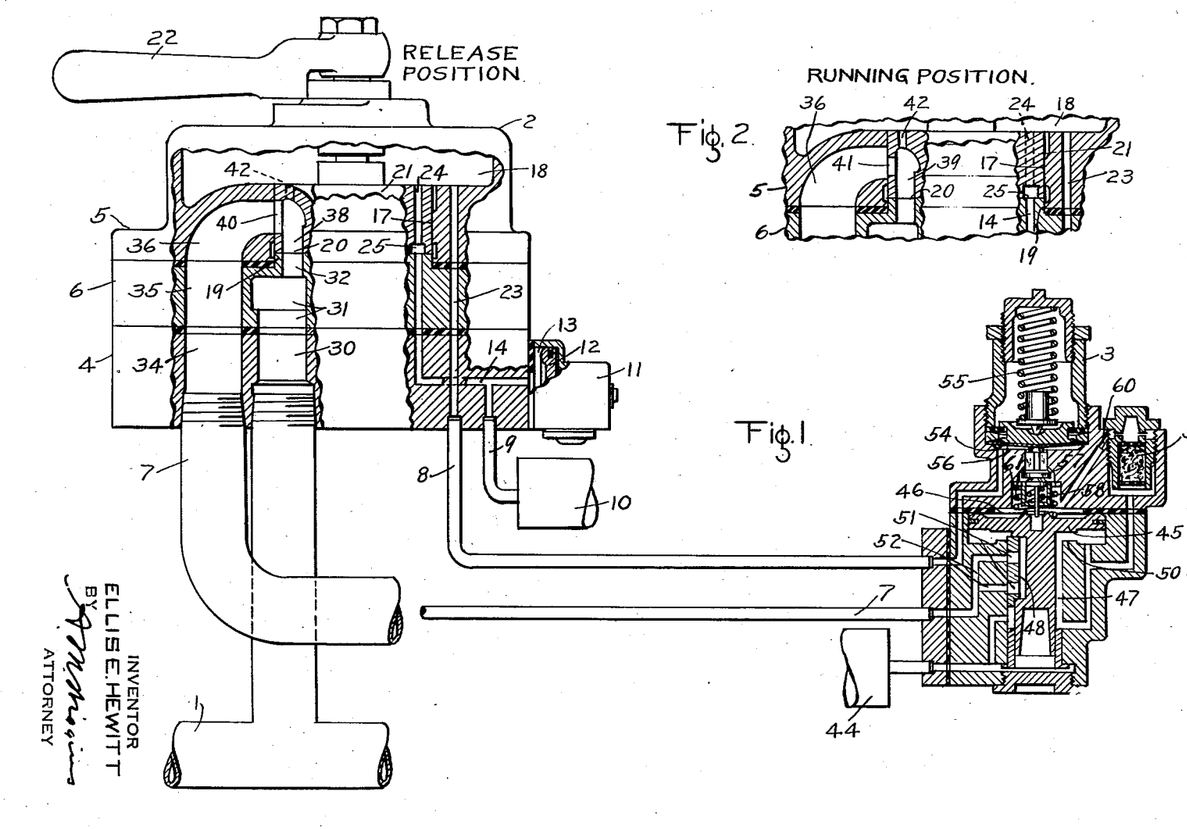
Fig. 1 is a diagrammatic view, partly in section and partly in outline, of the improved brake pipe charging control means including an engineer's automatic brake valve device shown in elevation with parts broken away to show, in the same plane, certain pertinent communications which are established in the release position.
Fig. 2 is a view similar to a portion of the brake valve device in Fig. 1 but with the rotary valve shown in running position.

In Fig. 1 the reference numeral 1 indicates the brake pipe on a locomotive which is adapted to be connected to the brake pipe on a train, in the usual manner. The improved charging means for the brake pipe 1 comprises an engineer's automatic brake valve device 2 and a feed valve device 3. For the sake of simplicity only those parts of the brake valve device are shown however which are deemed pertinent to a clear understanding of the invention.

The brake valve device 2 comprises a pipe bracket 4, a cover 5, and an intermediate section 6 which are mounted one on top of the other in the order shown and rigidly secured in this relation in the usual manner. To the pipe bracket 4 are connected the brake pipe 1, a fluid pressure supply pipe 7 leading to the feed valve device 3, a feed valve control pipe 8, and a pipe 9 which is connected to the usual equalizing reservoir 10. Mounted on one side of the bracket 4 is a brake pipe equalizing discharge valve mechanism 11 comprising the usual equalizing piston 12 having at one side a chamber 13 which is in constant communication with the equalizing reservoir 10 through a passage 14 and the pipe 9.

The cover section 5 of the brake valve device has a bore 17 open at its upper end to a rotary valve chamber 18. The intermediate section 6 has a boss 19 projecting into the lower end of bore 17 and provided on its end with a rotary valve seat 20. A rotary valve 21 having a neat turning fit in bore 17 is mounted to rotate on the seat 20. The rotary valve 21 is connected in the usual manner to an operating handle 22 which is adapted to be operated by the engineer of a locomotive for turning said valve to its different brake controlling positions including release position and running position for controlling the supply of fluid under pressure to the brake pipe 1, and the usual brake application positions for venting under pressure from said brake pipe.

The feed valve control pipe 8 is in constant communication with the rotary valve chamber 18 through a passage 23 extending through the bracket 4, the intermediate section 6 and the cover 5. The equalizing reservoir passage 14 is connected to the seat 20 of the rotary valve 21 and said rotary valve is adapted to connect said passage to the rotary valve chamber 18 in both the running and release positions of the brake valve device by way of a port 24 and a cavity 25 in the seating face of the rotary valve, said cavity registering with the equalizing reservoir passage 14 in both of said positions, as shown in Figs. 1 and 2.

Figure 3:
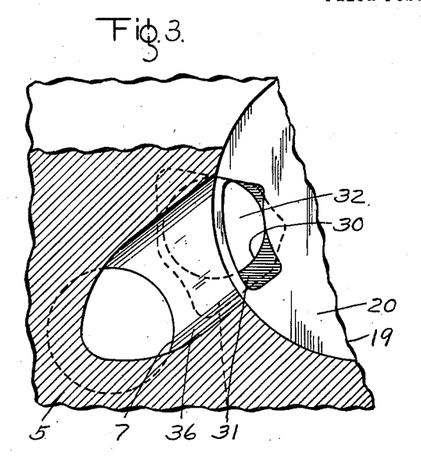
Fig. 3 is a plan view of a portion of the rotary valve seat of the brake valve device shown in Fig. 1, as actually constructed.

The brake pipe 1 is connected to the rotary valve seat 20 through a passage 30 in pipe bracket 4, a passage and cavity 31 in the section 6 and an arcuate shaped passage 32 which opens at said seat, it being noted from an inspection of Figs. 1, 2 and 3 that the passage 32 is of relatively great angular length with respect to its radial width.

The feed valve supply pipe 7 is connected through passages 34 and 35 in pipe bracket 4 and section 6 to a passage 36 in the cover 5.

The passage 36 leads to and opens through the wall of bore 17 to the side of rotary valve 21 between the top and bottom or ends thereof. The passage 36 makes a right angle bend between its connection with passage 35 and the rotary valve bore 17, as is clearly shown in Fig. 1, and the interior contour of this passage is so formed as to offer a minimum of restriction to air flow from pipe 7 to the peripheral face of the rotary valve 21.

The sectional view of the brake valve device in Fig. 1 shows the passages and cavities 30, 31, 32, 34, 35 and 36, just described, in their actual relative proportions in order to bring out the relative large flow communications thus provided between the feed valve supply pipe 7 and the peripheral face of the rotary valve 21 and between the brake pipe 1 and the seat of said rotary valve.

Figure 4:
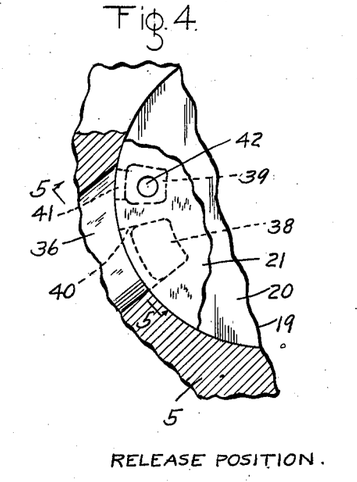
Fig. 4 is a view similar to Fig. 3 but showing a portion of the rotary valve, as constructed, mounted on the rotary valve seat, and in the release position with respect to said seat.
Figure 5:
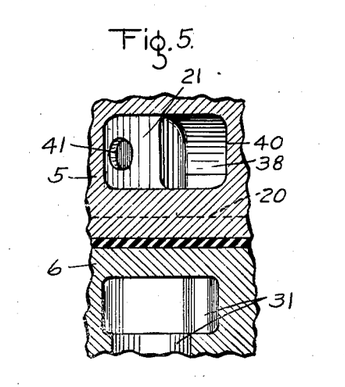
Fig. 5 is a sectional view taken on the line 5—5 in Fig. 4.
Figure 6:
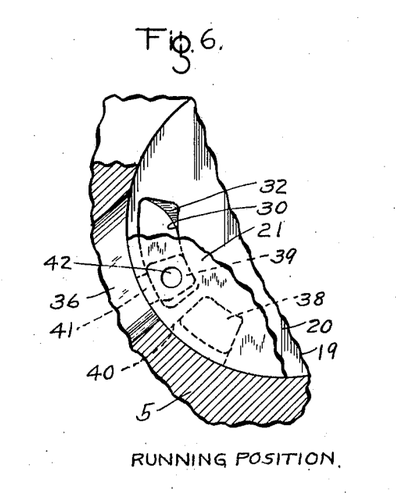
Fig. 6 is a view similar to Fig. 3 but showing the rotary valve in running position with respect to the rotary valve seat.

The rotary valve 21 in the release position shown in Figs. 1, 4 and 5 and in the running position shown in Figs. 2 and 6 is adapted to establish communication between the feed valve supply pipe 7 and brake pipe 1 through which the brake pipe is adapted to be charged with fluid under pressure. Accordingly, the rotary valve is provided with two passages 38 and 39 arranged side by side and opening at one end at the seating face of the rotary valve. The angular distance across these two passages at the seating face of the rotary valve substantially equals the angular length of passage 32 in the rotary valve seat 20, so that both will register with passage 32 in release position of the brake valve device, as shown in Fig. 4. In running position of the brake valve device only passage 39 is adapted to register with the passage 32 in the rotary valve seat, as shown in Fig. 6.

The passage 38 is connected by a passage 40 to the peripheral face of the rotary valve 21, the passage 40 being of substantially the same angular width as the passage 38 and having a height equal substantially to that of passage 36 at its point of opening to bore 17. The passage 39 in the rotary valve is connected by a bore 41 to the side face of the rotary valve. With the rotary valve in release position the passage 40 and bore 41 are both adapted to register with the passage 36, as shown in Figs. 4 and 5, while in running position of the rotary valve the passage 40 is adapted to be out of registry with passage 36, the bore 41 remaining in registration in this position, however, as shown in Fig. 6.

From an inspection of Figs. 1, 2 and 5 of the drawings it will be noted that the passages 38 and 39 and the passage 40 and bore 41, respectively, constitute two substantially right angle conduits connecting the peripheral face of the rotary valve to the seating face thereof and it will be further noted that the bend in these conduits is formed on a radius which at the upper end of the rotary valve terminates substantially in line with the top surface of passage 36 in cover 5. These conduits and the passage 36 therefore provide communications which are substantially in the form of inverted U's so as to offer a minimum of restriction to the flow of fluid under pressure from the feed valve pipe 7 to the brake pipe 1.

The rotary valve chamber 18 and thereby the equalizing reservoir 10 are adapted to be charged with fluid under pressure from passage 39 in release and running positions of the brake valve device by flow of fluid under pressure through a port 42 in the rotary valve. The port 42 is open to passage 39 in such a manner or at such an angle that the flow of fluid under pressure through said passage will create a suction like effect in port 42, depending in degree upon the velocity of flow through passage 39, in order to limit the pressure obtained in the rotary valve chamber and equalizing reservoir, while charging the brake pipe, to a degree less than in passage 39, for controlling through pipe 8 the operation of the brake valve device 3. This structure is therefore adapted to function on the principle of a Pitot tube to provide a pressure in the rotary valve chamber 18 which is lower than in passages 38 and 39 and equal to that in the brake pipe at a point remote from the brake valve device so as to thereby cause the brake valve device to operate at greater capacity for a certain pressure in the brake pipe than if controlled by the pressure of fluid delivered by the feed valve device to the supply pipe 7, as in conventional practice, as will be more fully described hereinafter.

The feed valve device 3 comprises a supply portion embodying a piston 45 having at one side a control chamber 46 and at the opposite side a pressure chamber 47 in constant communication with a main reservoir 44 of a locomotive fluid pressure brake system. In valve chamber 47 is a slide valve 48 which is connected to the piston 45 for movement therewith. A spring 61 in chamber 46 acting on piston 45 is adapted to move same and slide valve 48 from the position shown to a position defined by engagement between said piston and a stop 50. In operation the piston 45 and slide valve 48 are adapted to occupy any position intermediate the two extreme positions just mentioned, depending upon the pressure of fluid in chamber 46.

In the position of slide valve 48 shown in the drawing two ports 51 are fully open to two passages 52 which lead to the feed valve pipe 7 so as to provide a maximum rate of flow of fluid under pressure from the main reservoir 44 through the valve chamber 47 to said pipe for supplying fluid under pressure to the brake pipe 1 for charging same. When the piston 45 is in contact with the stop 50, the ports 51 in the slide valve 48 are adapted to be out of registry with the passages 52 so as to prevent the flow of fluid under pressure from the main reservoir 44 to the feed valve pipe 7. Different intermediate rates of flow of fluid under pressure to the feed valve pipe 7 are adapted to be obtained in the different intermediate positions of the supply piston 45 and slide valve 48 due to the communication between ports 51 in the slide valve and passages 52 being throttled to a greater or lesser extent.

For controlling the pressure of fluid in the piston chamber 46 there is provided a regulating portion which comprises a flexible diaphragm 54 subject on one side to the force of an adjustable regulating spring 55 and on the opposite side to the pressure in control pipe 8 acting in a chamber 56. The chambers 46 and 56 are connected through a bore in which is slidably mounted the fluted stem of a regulating valve 57, said stem engaging the diaphragm 56. When the force of spring 55 exceeds the pressure of fluid in chamber 56, the diaphragm 54 is operative to unseat the valve 57, and when less a bias spring 58 is adapted to seat said valve. The valve chamber 47 is in constant communication with the piston chamber 46 through a strainer device 59 and a choke 60.

Operation

In operation, let it be assumed that a locomotive having its main reservoir 44 charged with fluid under pressure is coupled up to a train of cars and that the brakes on the locomotive and cars are applied in emergency, under which condition the brake pipe 1 on the locomotive and cars and the equalizing reservoir 10 will be at substantially atmospheric pressure, as is well known. Let it further be assumed that the engineer now desires to charge the brake pipe to release the brakes on the train. To accomplish this he operates the brake valve handle 22 to turn the rotary valve 21 to release position, shown in Figs. 1, 4 and 5, and thereby establishes communication between the feed valve supply pipe 7 and brake pipe 1 and between the rotary valve chamber 18 and brake pipe 1 through port 42 and passage 39 in the rotary valve. As a result, the pressure of fluid which may be in the rotary valve chamber 18 at this time equalizes through port 42 into the brake pipe and causes through the feed valve control pipe 8, a like reduction in pressure in diaphragm chamber 56 in the feed valve device to below the opposing pressure of the adjustable spring 55. This spring then deflects the diaphragm 54 in a downwardly direction and unseats the regulating valve 57, so as to vent the fluid under pressure from piston chamber 46 to chamber 56 and thence through the pipe 8 to the rotary valve chamber 18 and brake pipe 1.

Under the condition being considered, the regulating valve 57 will initially be unseated sufficiently for the fluid pressure in chamber 46 to reduce, against the supply through choke 60, to a degree at which main reservoir pressure acting in chamber 47 on the opposite side of said piston will move said piston to its maximum supply position shown, against the opposing force of regulating spring 61. A fully open communication is thereby established between the slide valve chamber 47 and the feed valve supply pipe 7 through which fluid under pressure is adapted to flow from the main reservoir 44 to pipe 7 leading to the brake valve device 2.

Fluid under pressure thus supplied to the brake valve device then flows through passages 34, 35 and 36 to the peripheral face of the rotary valve and thence through passage 40 to passage 38 and also through bore 41 to passage 39. From passages 38 and 39 fluid under pressure then flows through passage 32 in the rotary valve seat, cavity and passage 31 and passage 30 to the brake pipe for charging same. It will be apparent that the contour of the inverted U-shaped charging communication just described offers a minimum of restriction to the flow of fluid under pressure from the feed valve supply pipe 7 to the brake pipe 1 and thus provides for rapid charging of the brake pipe.

When fluid under pressure is supplied to the brake as just described, fluid under pressure is adapted to flow from passage 39 in the rotary valve through port 42 to the rotary valve chamber 18 for charging same to control the operation of the feed valve device through the control pipe 8. However, the brake pipe charging communication including passage 39 and the connection of port 42 to said passage is so designed and arranged that the flow of fluid under pressure to the brake pipe will create a suction like effect at the connected end of port 42 which acts to retard the supply of fluid under pressure to the rotary valve chamber and to thereby limit the pressure obtained therein, while there is flow of fluid under pressure to the brake pipe, to a degree lower than acting in passage 39.

The differential between the pressures obtained in the rotary valve chamber 18 for controlling the feed valve device 3 and in passage 39 which is open to the brake pipe, varies while charging the brake pipe, in accordance with the velocity or rate of flow of fluid under pressure from the feed valve pipe 7 through the rotary valve to the brake pipe and therefore will be greatest upon initiating the charging of the brake pipe and will reduce as the brake pipe pressure increases with respect to the feed valve supply pressure in pipe 7 until at the time the brake pipe becomes substantially fully charged the said differential of fluid pressures will disappear and the pressure in the rotary valve chamber will become substantially equal to that in the brake pipe.

The effect of this Pitot tube like structure is therefore to provide in diaphragm chamber 56 a pressure for governing the operation of the feed valve device which is lower than in either the feed valve supply pipe 7 or in the brake pipe charging communication through the brake valve device and which will therefore correspond to that obtained in the brake pipe 1 at a point remote from the brake valve device 2.

As above described, the pressure of fluid in diaphragm chamber 56 is reduced upon initiating the charging of the brake pipe to a degree at which the regulating spring 55 unseats the regulating valve 57 so as to reduce the pressure in chamber 46 against the inflow through port 60 sufficiently for main reservoir pressure in chamber 47 to move the piston 45 and slide valve 48 to the positions shown in Fig. 1 for providing a maximum rate of fluid pressure supply to pipe 7.

As the pressure in the rotary valve chamber 18 and diaphragm chamber 56 increases upon an increase in pressure in brake pipe 1 the diaphragm 54 will be gradually moved against spring 55 and permit corresponding movement of the regulating valve toward its seat. The supply piston 45 and slide valve 48 will however remain in their fully open positions shown until the flow capacity of the outlet from chamber 46 past the regulating valve 57 is so reduced that the supply of fluid under pressure through choke 60 will increase the pressure in chamber 46 to a degree which, acting in conjunction with spring 61 will overcome main reservoir pressure in valve chamber 47. The piston 45 and slide valve 48 will then move downwardly until the pressure of spring 61 becomes reduced to a degree providing a balance of the opposing forces on said piston, this movement throttling however to a certain degree the supply of fluid under pressure to the supply pipe 7. A further increase in pressure in the brake pipe and in rotary valve chamber 18 and on diaphragm 54 will result in a further closing of the regulating valve 57 and consequent operation of piston 45 and slide valve 48 to effect a further and corresponding throttling of the flow of fluid under pressure to the supply pipe 7. The supply of fluid under pressure to the supply pipe 7 is thus adapted to be reduced as the pressure in the brake pipe and in rotary valve chamber 18 increases until the pressure obtained in diaphragm chamber 56 is able to deflect the diaphragm 54 sufficiently to permit the regulating valve 57 to seat. When this occurs the fluid pressure on opposite faces of the piston 45 will equalize through port 60 and spring 61 will then shift said piston into engagement with stop 50 and thereby position the slide valve to cut off all flow of fluid to the supply pipe 7 and thereby to the brake pipe 1.

According to the invention, the Pitot tube like structure delays the increase in pressure in the rotary valve chamber 18 and in chamber 56 to such a degree while charging the brake pipe that the regulating valve 57 will be held open sufficiently to maintain the supply piston 45 and slide valve 48 in the positions shown in Fig. 1 to provide the maximum rate of supply of fluid under pressure to the brake pipe, during the major portion of the brake pipe charging period, following which, the feed valve device will operate to reduce the rate of supply of fluid under pressure to the brake pipe according to the further increase therein until finally when the brake pipe becomes substantially fully charged the pressure of fluid in the rotary valve chamber 18 will be such that diaphragm 54 will be moved against spring 55 sufficiently to permit seating of the regulating valve 57 and thus closing off of all supply of fluid under pressure to the brake pipe.

In contrast to conventional arrangements in which the regulating diaphragm of the feed valve device is usually controlled by the pressure of fluid delivered by the feed valve device, it will now be apparent that the improved arrangement provides a lower pressure on the regulating diaphragm 54 and thereby a greater rate of supply of fluid under pressure to the brake pipe for a certain brake pipe pressure up to substantially a fully charged brake pipe. The maximum benefit of this improved arrangement is obtained of course in charging the brake pipe from substantially atmospheric pressure after an emergency application of brakes or upon initial charging, as is particularly desirable in order to expedite movement of a train. Material advantage is also obtained however, in charging the brake pipe after a full service reduction in pressure therein, but in charging the brake pipe after a light service reduction no appreciable advantage results nor is this of material importance.

This improved arrangement provides for charging the brake pipe on a train in substantially the same time as heretofore obtained by providing a direction communication between the main reservoir and the brake pipe through a brake valve device in release position. It is however to be noted that with this improved arrangement there is no possibility of charging the brake pipe 1 to a pressure greater than that desired as governed by the feed valve device, since when the brake pipe pressure is increased to that called for by the regulating spring 55 upon closure of the regulating valve 57, the pressure in chamber 56 will be substantially equal to that in the brake pipe 1 and the feed valve device will operate to cut off further flow of fluid to the brake pipe. Vigilance on the part of the engineer in the use of the release position of the brake valve device in this improved arrangement is therefore not required, as will be apparent.

After the brake pipe has been fully charged it is intended that the engineer will operate the brake valve handle 22 to turn the rotary valve 21 from release position to running position shown in Fig. 6. Passage 38 in the rotary valve is thus moved out of registry with passage 36 in the cover but passage 39 remains in communication with passage 36 through bore 41 as well as with the brake pipe passage 32 so that further supply of fluid under pressure to the brake pipe is limited to the capacity of said bore. The capacity of this bore is substantially the same as that of the brake pipe charging means employed in the running position of well known brake valve devices, so that the brake pipe pressure may be reduced by the usual conductor's valve or by a burst hose to ensure stopping of a train.

According to a further feature of the invention the equalizing reservoir 10 is connected to the rotary valve chamber 18 through port 24 and cavity 25 in the rotary valve in both release and running positions, as before described. By this arrangement a portion of the fluid under pressure supplied through port 42 to the rotary valve chamber 18 while charging the brake pipe will flow to the equalizing reservoir for recharging same and it has been found that the volume of this reservoir, thus added, in effect, to that of the rotary valve chamber 18, will in conjunction with the Pitot tube like control of the supply of fluid under pressure to the rotary valve chamber, cause an increased delay in the build up in pressure in the rotary valve chamber over that obtained when the reservoir is not connected to said chamber, and this results in the provision of a still lower control pressure in chamber 56 of the feed valve device for a certain brake pipe pressure than would otherwise be obtained. The connecting of the equalizing reservoir to the rotary valve chamber therefore conditions the feed valve device to provide a greater supply of fluid to the pipe 7 for a given brake pipe pressure than is otherwise obtained and this results in an increase in the rate of charging of the brake pipe.

Summary

From the above description it should now be noted that the improved brake pipe charging arrangement provides for charging the brake pipe on a train at a rate substantially equal to that provided by conventional arrangements in which the brake pipe is connected directly to the main reservoir on the locomotive. With this improved arrangement there is however no danger of overcharging the brake pipe to a degree in excess of that desired, since the charging pressure is limited by the feed valve device, and this fact obviates the need of attention or judgment on the part of the engineer to avoid undesired application of brakes on any part of the train while charging the train in preparing same for movement. The use of a large capacity feed valve device and a brake valve device constructed as described provides for attainment of these results.

The improvement in the brake valve device consists, in addition to the large flow capacity, U-shaped charging conduits of the Pitot tube like arrangement which provides for adjustment of the feed valve device in accordance with the pressure in the brake pipe at a point remote from the brake valve device to therefore obtain a greater rate of flow of fluid to the brake pipe for a given pressure in the brake pipe than has heretofore been obtained with well known arrangements.

By thus providing for the charging of a train in a minimum of time and avoiding the possibility of overcharge with the attendant dangers of undesired application of brakes on one or more cars on the train it will be apparent that this improved charging means not only makes charging of a train easier for the engineer but also will expedite the movement of a train.

While only one embodiment of the invention has been shown and described in detail it is not the intention to limit the scope to that embodiment or otherwise than by the terms of the appended claims.

Having now described my invention, what I claim as new and desire to secure by Letters Patent, is:

1. In combination, a pipe, a source of fluid pressure, and a valve device comprising a casing having a bore and a valve seat at one end of said bore, a cylindrical rotary valve disposed in said bore in contact with said seat and the side wall of said bore and cooperative with said seat and side wall to form a communication extending through said seat and side wall through which fluid under pressure is adapted to flow from said source to said pipe.

2. In combination, a pipe, a source of fluid pressure, and a valve device comprising a casing having a bore and a valve seat at one end of said bore, a cylindrical rotary valve disposed in said bore in contact with said seat and the side wall of said bore and cooperative with said seat and side wall to form a U-shaped communication extending through said seat and side wall through which fluid under pressure is adapted to flow from said source to said pipe.

3. In combination, a brake pipe, a source of fluid pressure, and a brake valve device comprising a casing having a chamber and a bore open at one end to said chamber, a rotary valve seat at the opposite end of said bore and a cylindrical rotary valve disposed in said bore with one end on said seat and cooperative with said casing to provide a brake pipe charging communication which is separate from said chamber and which is open at one end to said source and at the opposite end to said brake pipe.

4. In combination, a brake pipe, a source of fluid pressure, and a brake valve device comprising a casing having a chamber and a bore open at one end to said chamber, a rotary valve seat at the opposite end of said bore and a cylindrical rotary valve disposed in said bore with one end on said seat and cooperative with said casing to provide a brake pipe charging communication which is separate from said chamber and which is open at one end to said source and at the opposite end to said brake pipe, said rotary valve being operative in one position to open said communication and upon being turned from said position to close said communication.

5. In combination, a brake pipe, a source of fluid pressure, and a brake valve device comprising a casing having a chamber and a bore open at one end to said chamber, a rotary valve seat at the opposite end of said bore and a cylindrical rotary valve disposed in said bore with one end on said seat and with its peripheral surface in substantial contact with the side wall of said bore, said casing and rotary valve cooperating to provide a brake pipe charging communication between said source and brake pipe which extends through the peripheral surface of said valve and the side wall of said bore.

6. In combination, a brake pipe, a source of fluid pressure, and a brake valve device comprising a casing having a chamber and a bore open at one end to said chamber, a rotary valve seat at the opposite end of said bore and a cylindrical rotary valve disposed in said chamber with one end on said seat and with its peripheral surface in substantial contact with the side wall of said bore, said casing and rotary valve cooperating to provide a substantially U-shaped brake pipe charging communication which extends through said side wall of said bore and said peripheral surface of said valve and which at one end is open to said source of fluid pressure and at the opposite end to said brake pipe.

7. In combination, a brake pipe, a source of fluid pressure, and a brake valve device comprising a casing having a chamber and a bore open at one end to said chamber, a rotary valve seat at the oppoiste end of said bore and a cylindrical rotary valve disposed in said chamber with one end on said seat and with its peripheral surface in substantial contact with the side wall of said bore, said casing having a passage connected with said source and open at the side wall of said bore, said rotary valve having a passage open at one end at said peripheral surface and adapted in one position of said valve to register with the end of the passage in said casing which opens at said side wall, the other end of the passage in said rotary valve being open to said brake pipe to thereby provide a charging communication between said source of fluid pressure and said brake pipe in said one position of said valve, said valve upon movement from said one position breaking said communication.

8. In combination, a brake pipe, a source of fluid pressure, and a brake valve device comprising a casing having a chamber, a rotary valve in said chamber seated on an end wall of said chamber with its peripheral surface in substantial contact with the side wall of said chamber, a brake pipe passage in said casing connecting said brake pipe to the seat of said rotary valve, a fluid pressure supply passage in said casing connected to said source and opening at the side wall of said chamber, said rotary valve having an angular passage connecting the peripheral and seating surfaces thereof and adapted to provide communication between the fluid pressure supply passage opening at said side wall and the brake pipe passage opening at said seat for supplying fluid under pressure from said source to said brake pipe.

9. In combination, a brake pipe, a source of fluid pressure, and a brake valve device comprising a casing having a chamber one end of which constitutes a seat for a rotary valve, a rotary valve in said chamber seated on said seat with its peripheral face in substantial contact with the side wall of said chamber, a brake pipe passage in said casing connecting said brake pipe to the seat of said rotary valve, a fluid pressure supply passage in said casing open at one end to said source and having at the opposite end an angular portion opening at the side wall of said chamber, said rotary valve having an angular passage providing a fluid flow communication between the seating and peripheral faces thereof and adapted in one position of said valve to connect the brake pipe passage in said seating face to the fluid pressure supply passage in the side wall of said chamber for supplying fluid under pressure from said fluid pressure supply passage to said brake pipe for charging same, the outer wall of said angular passage in said rotary valve and of the angular portion of said fluid pressure supply passage adjacent the side wall of said chamber being formed on radii to provide a substantially U-shaped communication connecting the two passages in said casing.

10. In combination, a source of fluid pressure, a brake pipe, a brake valve device comprising a casing having a chamber an end wall of which constitutes a rotary valve seat, a rotary valve disposed in said chamber on said seat and with its peripheral surface in substantial contact with the side wall of said chamber, said rotary valve being rotatable on said seat to two different brake pipe charging positions, said casing having a fluid pressure supply passage connecting said source of fluid pressure to the side wall of said chamber and also having a brake pipe passage connecting said brake pipe to said seat, said rotary valve having a fluid conducting communication extending between the seating face and peripheral surface thereof and adapted in both of said positions to establish communication between the two passages in said casing for supplying fluid under pressure from said source to said brake pipe, and means operative upon rotation of said valve to one position to restrict the supply of fluid under pressure to said brake pipe to a degree less than in the other position.

11. In combination, a source of fluid pressure, a brake pipe, a brake valve device comprising a casing having a chamber an end wall of which constitutes a rotary valve seat, a rotary valve disposed in said chamber on said seat and with its peripheral surface in substantial contact with the side wall of said chamber, said rotary valve being rotatable on said seat to two different brake pipe charging positions, said casing having a fluid pressure supply passage connecting said source of fluid pressure to the side wall of said chamber and also having a brake pipe passage connecting said brake pipe to said seat, said rotary valve having a fluid conducting communication extending between the seating face and peripheral surface thereof and adapted in both of said positions and during movement between said two positions to provide communication between the said two passages in said casing for supplying fluid under pressure from said source to said brake pipe.

12. In combination, a source of fluid pressure, a brake pipe, a brake valve device comprising a casing having a chamber an end wall of which constitutes a rotary valve seat, a rotary valve disposed in said chamber on said seat and with its peripheral surface in substantial contact with the side wall of said chamber, said rotary valve being rotatable on said seat to two different brake pipe charging positions, said casing having a fluid pressure supply passage connecting said source of fluid pressure to the side wall of said chamber and also having a brake pipe passage connecting said brake pipe to said seat, said rotary valve having a fluid conducting communication extending between the seating face and peripheral surface thereof, and adapted in both of said positions and during movement between said two positions to provide communication between the two passages in said casing for supplying fluid under pressure from said source to said brake pipe, one of the ends of said fluid conducting communication cooperating with the end of the passage in said casing with which it registers to provide a certain rate of flow of fluid under pressure from said source to said brake pipe in one of said positions, a less rate of flow in the other position and a change in the rate of flow from one of said rates to the other upon movement of said rotary valve from one of said positions to the other.

13. In combination, a source of fluid pressure, a brake pipe, a brake valve device comprising a casing having a chamber, one end wall of which constitutes a rotary valve seat, a rotary valve mounted on said seat with its peripheral surface in substantial contact with the side wall of said chamber and rotatable on said seat to two different brake pipe charging positions, said casing having a fluid pressure supply passage connecting said source of fluid pressure to the side wall of said chamber and also having a brake pipe passage connecting said brake pipe to said seat, said rotary valve having two passages open at one end to said seat and at the opposite end to the peripheral surface of said valve and so arranged that in one of said positions both register with the end of said brake pipe passage in said seat and with the end of said fluid pressure supply passage in said chamber wall and upon movement from said one position to the other position one of said passages in said rotary valve is gradually moved out of registry with said supply passage in said chamber wall, and means in the rotary valve arranged to restrict the flow of fluid from said source to said brake pipe in the said other position.

14. In combination, a brake pipe, a source of fluid pressure, and a brake valve device having a U-shaped communication open at one end to said source of fluid pressure and at the opposite end to said brake pipe to provide for flow of fluid under pressure from said source to said brake pipe for charging said brake pipe, said brake valve device comprising a casing having a rotary valve chamber and a rotary valve disposed in said chamber with its peripheral surface in substantial contact with the wall of said chamber, and being rotatable in said chamber to two different brake pipe charging positions, said U-shaped communication extending through said side wall of said chamber and the peripheral surface of said rotary valve and comprising a passage in said casing open to said source of fluid pressure, two passages in said rotary valve one of which is adapted to communicate with said casing passage in one of said charging positions and both of which are adapted to communicate with said casing passage in the other of said charging positions, and another passage in said casing open at said rotary valve seat and connected to said brake pipe and arranged to communicate with said two passages in said rotary valve in one charging position and with only one of said two passages in said rotary valve in the other charging position.

15. In combination, a brake pipe, a source of fluid pressure, and a brake valve device having a U-shaped communication open at one end to said source of fluid pressure and at the opposite end to said brake pipe to provide for flow of fluid under pressure from said source to said brake pipe for charging said brake pipe, said brake valve device comprising a casing having a rotary valve chamber and a rotary valve disposed in said chamber with its peripheral surface in substantial contact with the wall of said chamber, and being rotatable in said chamber to two different brake pipe charging positions, said U-shaped communication extending through said wall of said chamber and the peripheral surface of said rotary valve and comprising a fluid pressure supply passage in said casing connecting said source of fluid pressure to the side wall of said chamber, and two communications in the rotary valve extending from the peripheral face to the seating face thereof for conducting fluid pressure from said supply passage to said brake pipe, both of said communications being open to said supply passage in one of said charging positions and only one of said communications being open to said supply passage in the other charging position.

16. In combination, a brake pipe, a source of fluid pressure, and a brake valve device having a U-shaped communication open at one end to said source of fluid pressure and at the opposite end to said brake pipe to provide for flow of fluid under pressure from said source to said brake pipe for charging said brake pipe, said brake valve device comprising a casing having a rotary valve chamber and a rotary valve disposed in said chamber with its peripheral surface in substantial contact with the wall of said chamber, and being rotatable in said chamber to two different brake pipe charging positions, said U-shaped communication extending through said wall of said chamber and the peripheral surface of said rotary valve and comprising a fluid pressure supply passage in said casing connecting said source of fluid pressure to the side wall of said chamber, and two communications in the rotary valve extending from the peripheral face to the seating face thereof for conducting fluid pressure from said supply passage to said brake pipe, both of said communications being open to said supply passage in one of said charging positions and only one of said communications being open to said supply passage in the other charging position, the opening between the last named communication and supply passage in both charging positions being relatively small with respect to the opening between the other communication and supply passage in the position in which it is effective.

17. In a fluid pressure brake, in combination, a feed valve device operative to supply fluid under pressure to said brake pipe at a rate dependent upon the pressure of fluid in a chamber, a brake valve device having a position for opening communication between said feed valve device and brake pipe, and means connected to said chamber for supplying fluid under pressure thereto and subject to the flow of fluid under pressure through said communication at the brake pipe side of the connection between said devices and operative on the principle of a Pitot tube to limit the pressure in said chamber to a degree which is lower than in said communication at said means depending upon the velocity of flow through said communication at said means.

18. In a fluid pressure brake, in combination, a brake pipe, a feed valve device operative to supply fluid under pressure to said brake pipe at a rate dependent upon the pressure of fluid in a chamber, a brake valve device having a position for opening communication between said feed valve device and brake pipe, and means connected to said chamber for supplying fluid under pressure thereto and subject to the flow of fluid under pressure through said communication at the brake pipe side of the connection between said devices and operative on the principle of a Pitot tube to limit the pressure in said chamber to a degree which is lower than in said communication at said means in accordance with the velocity of such supply, said brake valve device being operative to disconnect said chamber from said brake pipe upon movement out of said position.

19. In a fluid pressure brake, in combination, a brake pipe, a feed valve device operative to supply fluid under pressure to said brake pipe at a rate dependent upon the pressure of fluid in a chamber, a brake valve device having a position for opening communication between said feed valve device and brake pipe, and means connected to said chamber and subject to the flow of fluid under pressure to said brake pipe and operative on the principle of a Pitot tube to limit the pressure in said chamber to a degree less than supplied to said brake pipe past said means in accordance with the velocity of such supply, and an equalizing reservoir connected to said chamber and adapted to be charged with fluid under pressure therefrom.

20. In a fluid pressure brake, in combination, a brake pipe, a feed valve device operative to supply fluid to said brake pipe at a rate dependent upon the pressure of fluid in a chamber, and a brake valve device operative to open communication between said feed valve device and brake pipe and having a port connecting said chamber to said communication for supplying fluid under pressure to said chamber, said port opening to said communication in such a manner that the flow of fluid through said communication acts to limit the pressure in said chamber to a degree lower than in said communication depending upon the velocity of flow of fluid under pressure through said communication.

21. In a fluid pressure brake, in combination, a brake pipe, a feed valve device operative to supply fluid to said brake pipe at a rate dependent upon the pressure of fluid in a chamber, and a brake valve device operative to open communication between said feed valve device and brake pipe and having a port connecting said communication to said chamber for supplying fluid under pressure to said chamber, said port being open to said communication in such a manner that the flow of fluid through said communication to said brake pipe will retard the increase in pressure in said chamber with respect to the increase in pressure in said brake pipe in accordance with the velocity of flow of fluid under pressure through said communication.

22. In a fluid pressure brake, in combination, a brake pipe, a feed valve device operative to supply fluid to said brake pipe at a rate dependent upon the pressure of fluid in a chamber, and a brake valve device operative to open communication between said feed valve device and brake pipe, said communication being in the form of a U-shaped conduit, and a port connecting said chamber to the outlet side of said conduit for supplying fluid under pressure to said chamber, the connection between said port and conduit being so arranged as to provide an increase in pressure in said chamber to a degree less than in said brake pipe in accordance with the rate of flow of fluid under pressure through said conduit.

23. In a fluid pressure brake, in combination, a brake pipe, a fluid pressure supply pipe, a feed valve device operative to supply fluid under pressure to said supply pipe at a rate dependent upon the pressure of fluid in a chamber, a brake valve device operative to connect said pipes to provide for charging of said brake pipe with fluid under pressure supplied by said feed valve device, and a port connecting said chamber to the communication in said brake valve device through which fluid under pressure is supplied to said brake pipe for supplying fluid under pressure to said chamber, the connection between said port and communication being so arranged that the flow of fluid under pressure through said communication retards the supply of fluid under pressure through said port to said chamber so as to limit the increase in pressure in said chamber, in accordance with the velocity of flow of fluid under pressure through said communication, to a degree lower than in said supply pipe.

24. In a fluid pressure brake, in combination, a brake pipe, a fluid pressure supply pipe, a feed valve device operative to supply fluid under pressure to said supply pipe at a rate dependent upon the pressure of fluid in a chamber, a brake valve device operative to connect said pipes to provide for charging of said brake pipe with fluid under pressure supplied by said feed valve device, and a port connecting said chamber to the communication in said brake valve device through which fluid under pressure is supplied to said brake pipe for supplying fluid under pressure to said chamber, the connection between said port and communication being so arranged that the flow of fluid under pressure through said communication retards the supply of fluid under pressure through said port to said chamber so as to limit the increase in pressure in said chamber, in accordance with the velocity of flow of fluid under pressure through said communication, to a degree no greater than that in said brake pipe adjacent said brake valve device.

25. In a fluid pressure brake, in combination, a brake pipe, a fluid pressure supply pipe, a feed valve device operative to supply fluid under pressure to said supply pipe at a rate dependent upon the pressure of fluid in a chamber, a brake valve device operative to connect said pipes to provide for charging of said brake pipe with fluid under pressure supplied by said feed valve device, and a port connecting said chamber to the communication in said brake valve device through which fluid under pressure is supplied to said brake pipe for supplying fluid under pressure to said chamber, the connection between said port and communication being so arranged that the flow of fluid under pressure through said communication retards the supply of fluid under pressure through said port to said chamber so as to limit the increase in pressure in said chamber, in accordance with the velocity of flow of fluid under pressure through said communication to a degree substantially equal to that in said brake pipe.

26. In a fluid pressure brake, in combination, a brake pipe, a fluid pressure supply pipe, a brake valve device comprising a casing having a chamber, a rotary valve in said chamber having a position for establishing communication between said pipes, and a feed valve device controlled by the pressure of fluid in said chamber and operative to supply fluid under pressure to said supply pipe for flow through said brake valve device to said brake pipe at a rate dependent upon the pressure of fluid in said chamber, and means controlled by the fluid pressure supply to said brake pipe for adjusting the pressure of fluid in said chamber to a degree lower than in said communication.

27. In a fluid pressure brake, in combination, a brake pipe, a fluid pressure supply pipe, a brake valve device comprising a casing having a chamber, a rotary valve in said chamber having a position for establishing communication between said pipes, and a feed valve device subject to and controlled by the pressure of fluid in said chamber and operative to supply fluid under pressure to said supply pipe for flow through said brake valve device to said brake pipe at a rate dependent upon the pressure of fluid in said chamber, a port connecting said chamber and communication for charging said chamber with fluid under pressure, and an equalizing reservoir connected to said chamber and adapted to be charged with fluid under pressure therefrom.

28. In a fluid pressure brake, in combination, a brake pipe, a fluid pressure supply pipe, a brake valve device comprising a casing having a chamber, a rotary valve in said chamber having a position for establishing communication between said pipes, and a feed valve device subject to and controlled by the pressure of fluid in said chamber and operative to supply fluid under pressure to said supply pipe for flow through said brake valve device to said brake pipe at a rate dependent upon the pressure of fluid in said chamber, and means connecting said chamber to said communication through which fluid under pressure is adapted to be supplied from said communication to said chamber.

29. In a fluid pressure brake, in combination, a brake pipe, a fluid pressure supply pipe, a brake valve device comprising a casing having a chamber, a rotary valve in said chamber having a position for establishing communication between said pipes, and a feed valve device controlled by the pressure of fluid in said chamber and operative to supply fluid under pressure to said supply pipe for flow through said brake valve device to said brake pipe at a rate dependent upon the pressure of fluid in said chamber, and means subject to the rate of flow of fluid under pressure through said communication and operative to supply fluid under pressure to said chamber in an amount for adjusting the pressure in said chamber to a degree lower than in said communication dependent upon the rate of flow of fluid under pressure through said communication.

30. In a fluid pressure brake, in combination, a brake pipe, a fluid pressure supply pipe, a brake valve device comprising a casing having a chamber and having a bore open to said chamber, a rotary valve in said bore seated on an end wall thereof and having substantial contact between its peripheral surface and the side wall of said bore, said rotary valve in one position establishing communication between said pipes, a feed valve device controlled by the pressure of fluid in said chamber and operative to supply fluid under pressure to said supply pipe at a rate dependent upon the pressure of fluid in said chamber, and a port in said rotary valve connecting said communication and chamber to supply fluid under pressure from said communication to said chamber to control the operation of said feed valve device.

31. In a fluid pressure brake, in combination, a brake pipe, a fluid pressure supply pipe, a brake valve device comprising a casing having a chamber and having a bore open to said chamber, a rotary valve in said bore seated on an end wall thereof and having substantial contact between its peripheral surface and the side wall of said bore, said rotary valve in one position establishing communication between said pipes, a feed valve device controlled by the pressure of fluid in said chamber and operative to supply fluid under pressure to said supply pipe at a rate dependent upon the pressure of fluid in said chamber, and a port in said rotary valve connecting said communication and chamber to supply fluid under pressure from said communication to said chamber to control the operation of said feed valve device, said communication being in the form of a U-shaped conduit connected at one end to said supply pipe and at the other end to said brake pipe and extending through the peripheral surface of said rotary valve and the contacting surface of said bore, and said port in said rotary valve connecting said chamber to said conduit in such a manner that the pressure in said chamber will be lower than in said conduit in proportion to the velocity of flow of fluid under pressure through said conduit.

ELLIS E. HEWITT.